United States Patent [19]

Motes-Conners et al.

[11] 4,091,514
[45] May 30, 1978

[54] SUBSEA MACHINE TOOL

[75] Inventors: Corroll J. Motes-Conners; Lawrence E. Satterwhite, both of Houston, Tex.

[73] Assignee: HydroTech International, Inc., Houston, Tex.

[21] Appl. No.: 682,158

[22] Filed: Apr. 30, 1976

[51] Int. Cl.$^2$ .................. B23K 1/20; B23K 7/04; B23P 11/00

[52] U.S. Cl. .................. 29/33 T; 61/111; 90/15 A; 90/24 C; 228/29; 228/32; 266/54; 266/56

[58] Field of Search .................. 90/12 R, 15 A, 15 B, 90/24 C; 408/105, 104, 106; 82/4 C; 228/25, 29, 32, 42; 29/33 T; 61/105, 107, 110, 111; 33/174 L; 51/241 B; 266/54, 56

[56] References Cited

U.S. PATENT DOCUMENTS

| | | | |
|---|---|---|---|
| 1,915,912 | 6/1933 | Anderson | 266/56 |
| 2,842,238 | 7/1958 | Shaw et al. | 90/12 R |
| 3,557,462 | 1/1971 | Kiewicz et al. | 33/174 L |
| 3,578,233 | 5/1971 | Meister et al. | 61/111 X |
| 3,650,514 | 3/1972 | Stunkard | 408/105 |
| 3,711,938 | 1/1973 | Warren et al. | 61/110 X |
| 4,007,705 | 2/1977 | Sherer et al. | 266/56 X |

*Primary Examiner*—Z. R. Bilinsky

*Attorney, Agent, or Firm*—James A. Bargfrede

[57] ABSTRACT

A subsea machine tool for preparing the end of a bare piece of pipe in a subsea location for receiving an overfitting coupling and includes a support assembly adapted for raising and lowering in a body of water. A pipe clamp is attached to each end of the support assembly for clamping the pipe. A split frame is supported by the support assembly for axial travel. A split ring gear assembly is supported by the frame for rotation therein and about the pipe section. The split ring gear is in the form of a spool assembly wherein an involute gear forms one flange of the spool and a face plate forms the other flange. The spool is supported about the exterior thereof by a split fixed ring which in turn is supported by the frame. The fixed ring has mounted thereon one or more hydraulic motors which are arranged for rotating the ring gear relative to the fixed ring. The face plate has mounted thereon for rotation therewith work means in the form of a milling machine. Another tool is mounted on the face plate for sensing out-of-roundness of the pipe and the concentricity of the pipe relative to the ring gear, and for providing a read-out of any variations in roundness or concentricity, which read-out may then be used to operate the milling machine to remove the discontinuity.

6 Claims, 8 Drawing Figures

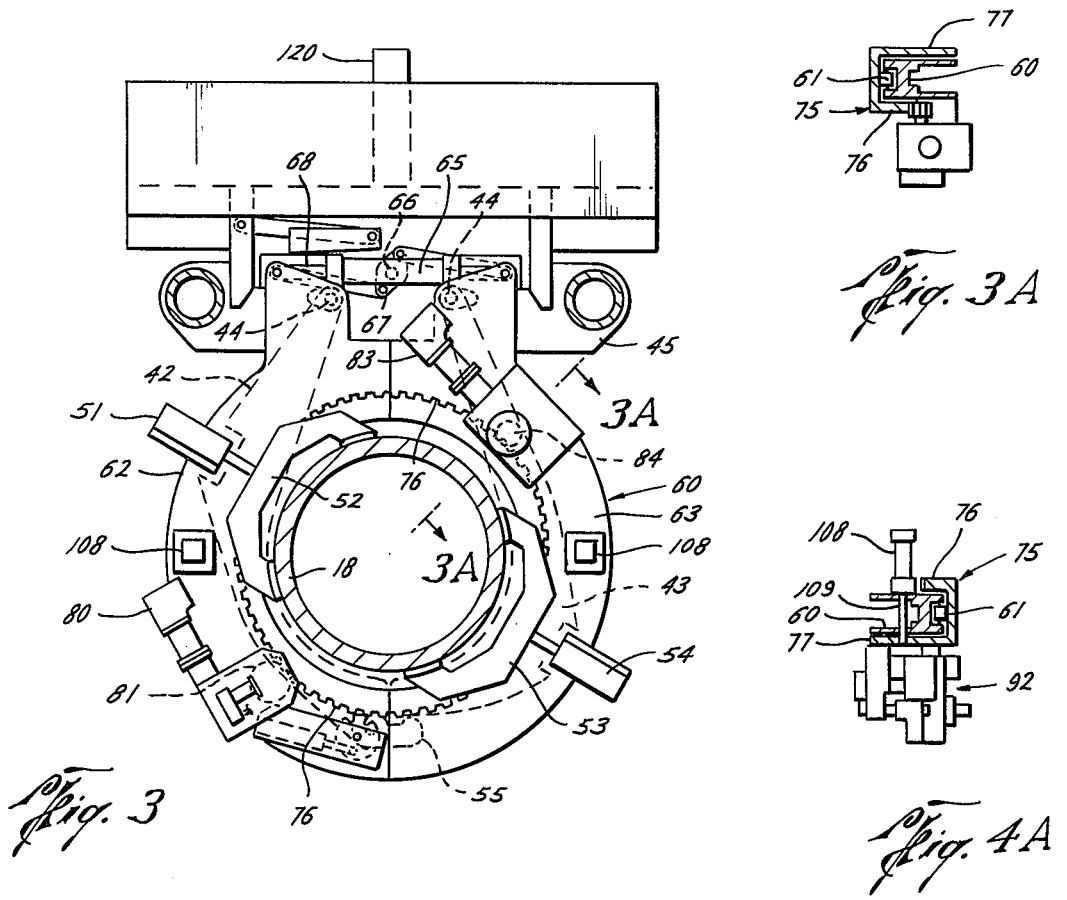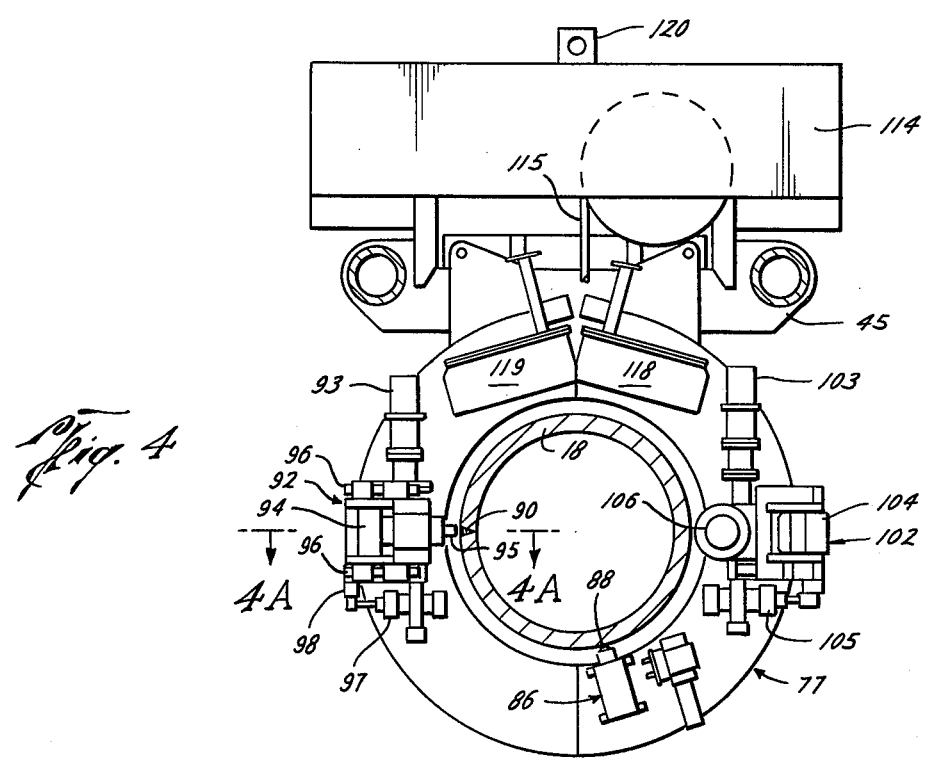

SUBSEA MACHINE TOOL

BACKGROUND OF THE INVENTION (a) Field of the Invention

This apparatus relates to subsea tools of the type which can be lowered in a body of water for the purpose of preparing a pipe end for receiving of an overfitting coupling, or performing other work thereon.

(b) Description of the Prior Art

As increasing amounts of hydrocarbon fuels are discovered in offshore locations, a need has arisen for providing underwater pipelines from such locations to more accessible locations, or to repair such pipelines. At certain times the underwater pipe will have external discontinuities and uneven end surfaces which must be milled or otherwise cut off so as to prepare the pipe to receive overfitting couplings which are being used with increased frequency to make such repairs and couplings, as compared with older welding methods. For example, one tool has been developed which is arranged for lowering in a body of water, clamping about a pipe and making a circumferential cut therein. However, other operations are required on the end of such a pipe in order to prepare the same for the receipt thereon of an overfitting coupling, such preparations, for example, measuring the roundness of the pipe, and milling off any external protrusions. Moreover, it is desirable to have a tool which can be operated remotely to carry out these various functions with a minimum of diver assistance and in a relatively short period of time.

SUMMARY OF THE INVENTION

It is therefore an object of this invention to provide an improved subsea machine which will perform a number of functions while being attached to the subsea pipe.

This invention is for an apparatus for performing work on a subsea pipe and includes a pipe clamp adapted for clamping about the subsea pipe. A split frame is operably connected to and axially movably supported, at least in part, by the clamp, the frame being adapted for opening and closing about a section of pipe axially adjacent to the clamp. The tool includes power means for moving the frame axially relative to the clamp as well as a split ring gear supported by the frame for opening and closing and for rotation about the pipe section. Power means are provided for rotating the ring gear relative to the frame. Means are also supported by the ring gear for performing work on the pipe.

The work means may include means for milling a portion of the pipe section to provide a smoother exterior surface, means for making a circumferential cut in the pipe section to thereby sever the pipe, and/or means for measuring the roundness of the pipe section and providing a read-out thereof.

Various novel features of the tool includes means for varying the speed of rotation of the ring gear to provide one speed for rotating the ring gear to perform certain work and another speed for rotating the gear for positioning purposes. Another feature includes means connected to the frame for moving the ring gear axially relative to the clamp so that the work means may perform over a larger surface area without reclamping of the tool to the pipe. These and other novel features of the invention will become obvious by reference to the drawings and the description hereinafter provided.

BRIEF DESCRIPTION OF THE DRAWING

FIG. 3 is a cross-sectional view generally taken along line 3—3 of FIG. 1, but showing the adjacent split frame in overlaying dash lines.

FIG. 3A is a cross-sectional view taken generally along line 3A—3A of FIG. 3, showing the arrangement of the fixed ring and spool assembly.

FIG. 4 is a cross-sectional view taken generally along line 4—4 of FIG. 1, and showing the mounting of certain work means on the face plate.

FIG. 4A is a sectional taken generally along line 4A—4A of FIG. 4, showing the arrangement of the spool assembly and fixed ring in combination with the milling machine and the indexing means of the invention.

DESCRIPTION OF THE PREFERRED EMBODIMENT

Figure 5:
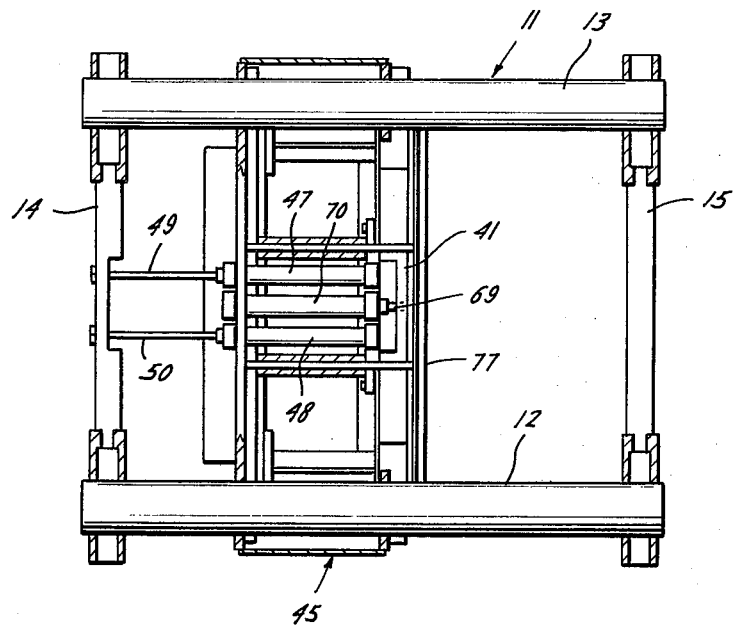
FIG. 5 is a sectional view taken generally along line 5—5 of FIG. 1, showing the mounting of the split frame on the support assembly.
Figure 6:
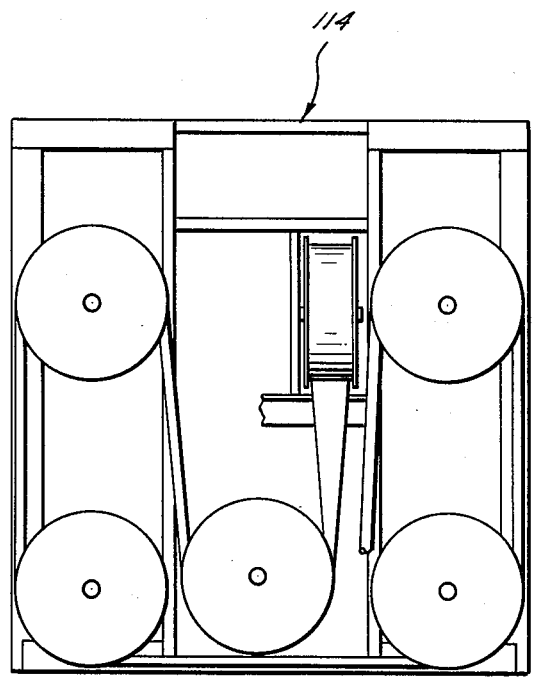
FIG. 6 is a top plan view of the hose-reel assembly.

Referring now to the drawings, the presently preferred embodiment of the invention will be described. The numeral 11 generally designates a support beam assembly which is comprised of two tubular beams 12 and 13, the ends of which are joined by a pair of transverse cross members 14 and 15, as best seen in FIG. 5, rigidly afixed thereto. Each cross member 14 and 15 has depending therefrom means for clamping about pipe 18 to thereby provide support for support beam assembly 11. This support means takes the form of pipe clamps 19 and 20, one of which is attached to each end of support beam assembly 11 and which are substantially identical. Accordingly, only one of the clamps 19, 20 will be explained in detail, it being understood that both are substantially identical.

Figure 2:
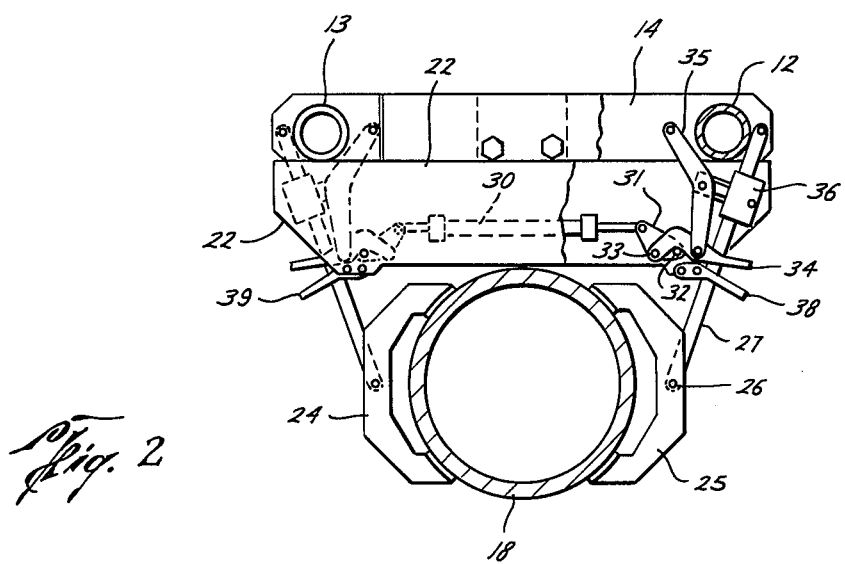
FIG. 2 is a cross-sectional view generally taken along line 2—2 of FIG. 1, with portions broken away for better viewing.

Cross member 14 has attached thereto and depending therefrom a channel-shaped member 22, which generally houses portions of the operating components of pipe clamp 19. Clamp 19 is comprised of a pair of generally U-shaped jaws 24 and 25 which are adapted for engaging opposing sides of pipe 18. Jaw 25 is pivotally supported by pin 26 connected to a somewhat flexible support arm 27, the upper end of which is pivotally connected to cross-member 14 by pivot pin 28. Channel member 22 has supported therein double-acting hydraulic cylinder assembly 30, one end which is shown pivotally connected to pivot link 31 which is generally triangular in shape and arranged for mounting on fixed pivot pin 32 for rotation thereabout. The apex of link 31 is pivotally connected by pin 33 to toggle arm 34, which in turn is pivotally connected to L-shaped link 35, the upper end of which is pivotally connected to support member 14, as shown. Link 35 is pivotally connected at a point intermediate the ends thereof to clamp 36 which is fixedly mounted on arm 27. Hence, upon operation of cylinder assembly 30 to extend the piston rod therefrom, pivot link 31 is rotated in a clockwise direction, as viewed in FIG. 2, which causes unlatching of toggle link 35, and movement of the support arm 27 to the right to disengage jaw 25 from pipe 18. The reverse operation is carried out when it is desired to engage jaw 25 with pipe 18. It is understood that jaw 24 is operated by a similar means upon operation of cylinder assembly 30 and therefore need not be described in detail. It is to be understood that channel 22 may have attached thereto a pair of fixed handles 38 and 39 which may be used to manipulate toggle link 35 manually, if desired, to disengage clamps 19 and 20 from pipe 18.

Figure 1:
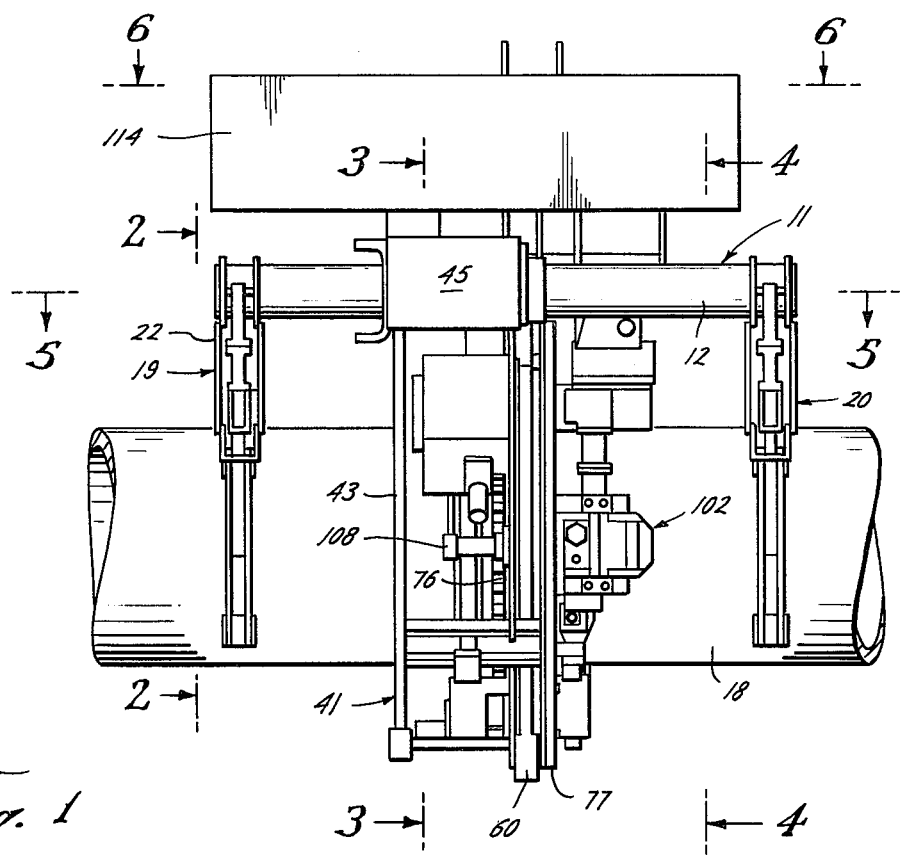
FIG. 1 is side elevation view generally showing the presently preferred embodiment of the invention mounted on a subsea pipe ready to perform work operations thereon.

The invention includes an exterior split support frame 41 which is shown in heavy lines in FIG. 1, and in dash lines in FIG. 3. Frame 41 is comprised of two half sections 42 and 43 which are connected by pivot pins 44 to frame support assembly 45, each end of which is arranged for sliding movement on a tubular beam 12 and 13. For the purpose of convenience, frame support assembly 45 is sometimes herein referred to as carriage means.

Power means are provided for moving frame support assembly 45 and split frame 41 axially on beams 12 and 13, which means take the form of a pair of double-acting hydraulic cylinder assemblies 47 and 48 having piston rods 49 and 50, respectively, the ends of which attach to cross member 14. Upon application of hydraulic fluid to the appropriate ends of cylinder assemblies 47 and 48, frame support assembly 45 can be moved axially thereon.

At certain times it may become desirable to attach split frame 41 to pipe 18. Accordingly, section 42 of split frame 41 has mounted thereon and supported thereby a generally U-shaped jaw 52 which is arranged for radial inward or outward movement by hydraulic cylinder assembly 51 attached to section 42. Similarly, section 43 of split frame 41 supports another generally U-shaped jaw 53 which is spaced 180° from jaw 52 and is similarly arranged for radial inward and outward movement by hydraulic cylinder assembly 54 attached to section 43, as shown in FIG. 3. In the closed position, sections 42 and 43 of split frame 41 are arranged to be clamped shut and locked by hydraulically actuated latch 55.

Split frame 41 includes a split fixed ring designated by the numeral 60, the outer surface of which has mounted thereabout twelve circumferentially spaced rollers 61. Fixed ring 60 is comprised of two halves 62 and 63, which are also supported on pivot pins 44 mounted in support assembly 45. Frame 41 and halves 62 and 63 of fixed ring 61 are adapted for rotation about pins 44 by means of hydraulic cylinder assembly 65, each end of which is attached to upwardly protruding portions of sections 62 and 63, such that upon extension of cylinder 65, split frame 41, and including sections 62 and 63, are caused to close about pipe 18. Upon retraction of cylinder assembly 65, sections 62 and 63 and split frame 41 are arranged for opening sufficiently wide to provide entry and escape of pipe 18 therefrom. Cylinder assembly 65 is connected to pivot pin 66 which has mounted thereon a rotatable link 67, each end of which is connected to an equalizer link 68, which assures equal opening in both directions of frame 41 and fixed ring 60.

Frame 41 and fixed ring 60 are arranged for axial movement relative to support assembly 45 by operation of another hydraulic cylinder assembly 70, one end of which, as shown in FIG. 5, is connected to frame support assembly 45, with piston rod 69 thereof being connected to an upper portion of frame 41. Hence, upon operation of double-acting hydraulic cylinder 70, frame 41 and hence fixed ring 60 can be moved axially relative to frame support assembly 45 and relative to support beam assembly 11.

Fixed ring 60 supports therewithin two semi-circular halves of a spool generally designated by the numeral 75, one flange of which is formed with gear teeth thereabout to form an involute ring gear 76, and the other flange of which is in the form of a face plate 77. The radially outward surface of spool 75 is arranged to engage rollers 61. The sides of ring gear 76 and face plate 77 which are adjacent to fixed ring 60 are provided with appropriate friction-free type surfaces to facilitate rotation of spool 75 in fixed ring 60.

Section 62 of fixed ring 60 has mounted thereon a hydraulic motor 80 which is arranged to operate pinion gear 81 which in turn is arranged to engage ring gear 76 for fast rotation thereof and quick circumferential positioning of face plate 77. Section 63 of fixed ring 60 has mounted thereon another hydraulic motor 83 which is arranged to rotate gear 84 which also engages ring gear 76 to rotate the same at a controlled feed rate.

Face plate 77 of spool 75 has mounted thereon various work means including pipe gauge assembly 86 for measuring out-of-roundness of pipe 18 and measuring concentricity of face plate 77 relative to pipe 18. This assembly includes a stylus 88 which is biased into contact with the external surface of pipe 18 during rotation of face plate 77. Stylus 88 is connected to LVDT (linear variable displacement transmitter) of conventional design, which gives an electrical signal read-out proportional to variations in the radial position of stylus 88 during rotation about pipe 18. Stylus 88 is arranged to detect and read out variations in the roundness of the external surface of pipe 18, as for example, the out-of-roundness created by longitudinal weld seam 90 which is formed in pipe 18 during the manufacturing process.

In order to provide a smooth surface to the exterior of pipe 18, it is necessary to mill off the protruding portion of weld seam 90. Accordingly, the left portion of face plate 77 has mounted thereon milling machine 92, which includes hydraulic motor 93 mounted on frame 94. Motor 93 is arranged to rotate cutting tool 95 shown mounted in frame 94. Frame 94 is mounted for radial movement on a pair of support rods 96 which are attached to face plate 77. Radial travel of frame 94 is accomplished by hydraulic cylinder assembly 97, the rod of which is attached to crank 98. Upon retraction of cylinder assembly 97, frame 94 is moved radially outwardly, and upon extension thereof, frame 94 is moved radially inward controlling contact of cutting tool 95 with weld seam 90.

The other half of face plate 77 also has mounted thereon a pipe cutter assembly generally designated by the numeral 102 which includes a hydraulic motor 103 which is supported by another radially movable frame 104, which is also mounted on support rods (not shown) attached to face plate 77. Frame 104 is arranged for radially inward and outward movement by operation of another hydraulic cylinder assembly 105 connected to face plate 77, such that upon extension and retraction of cylinder assembly 105, frame 104 is caused to move radially inwardly and outwardly, in the same manner as frame 94. Hydraulic motor 103 is arranged to rotate rotary cutting blade 106 which is arranged to make a circumferential cut through pipe 18, thereby severing the same.

When fixed ring 60 is in the open position, it is necessary to provide means to prevent the halves of spool 75 from falling therefrom. Hence, indexing and retaining means are provided in the form of a pair of hydraulic actuator cylinders 108, each of which is connected to an indexing pin 109, as shown in FIG. 4A, which is arranged to extend through mating holes in fixed ring 60 and face plate 77, thereby pinning the halves of spool 75 to the adjacent half section of fixed ring 60.

During operation of the apparatus and the various hydraulic motors and hydraulic cylinder assemblies, it is necessary to provide a source of pressurized hydraulic fluid, which requires hydraulic lines which can accomodate the aforesaid relative rotational and axial movements. A hose reel box 114 is mounted above and supported by frame support assembly 45. Hose reel box 114 is provided with a plurality of reels arranged to pay out and take up hydraulic hoses as required to avoid entangling the same in operation of the tool. For purposes of convenience, only one such hose 115 is shown in FIG. 4 as depending from reel box 114. In order to reduce the number of hydraulic lines required, hose 115 may pass through solenoid operated valves mounted on face plate 77, which valves can split the source of pressurized hydraulic fluid to operate more than one hydraulic unit. Such solenoid valves are mounted in boxes 118 and 119 connected to the respective halves of face plate 77, for example, for rotation therewith. Similarly, electrical lines may be mounted in the same fashion in reel box 114 to provide the communication of necessary electrical signals, as for example, signals generated by stylus 88 and such other electrical component control features as are desired. For the purpose of convenience, reel box 114 may also have attached therewith a lifting eye 120 which provides means for raising and lowering the entire tool in a body of water.

Each of the hydraulic power means heretofore described are arranged for control by valves operated from a control panel at a remote location, as for example, at the water surface. The control console can be operated at the remote location either manually or by electronic sequence controls of conventional type. Such controls may include various read-out means to give the operating position of the various tools, as for example, the radial position of each work tool on face plate 77, relative to fixed ring 60, the radial orientation of spool 75, the linear location of frame 41 along support beams 12 and 13, and measurements generated by stylus 88, as discussed above.

In operation, it is assumed that pipe 18 will have been initially cleaned of weight-coating material, such as concrete, such that the surface of the pipe 18 is ready to receive the apparatus of this invention. The apparatus is lowered from the sea surface by any convenient means attached to lifting eye 120. Clamps 19 and 20 are in the open position for receiving pipe 18 thereinto, as would be frame 41, fixed ring 60, spool 75, and face plate 77. Index pins 109 are in the index position shown in FIG. 4A to retain the semicircular segments of spool 75 in their respective halves of fixed ring 60. Jaws 52 and 53 are radially retracted, as are gauge assembly 86, milling machine 92, and pipe cutter assembly 102. Thereafter, the apparatus is lowered onto pipe 18 until support beam assembly 11 is generally parallel with and above pipe 18.

Support frame 41, along with fixed ring 60, is then closed by operation of cylinder assembly 65, which thus spaces fixed ring 60 about pipe 18. The closing of fixed ring 60 causes the closing of spool 75 and the entrapment thereof within fixed ring 60, at which point latch 55 is moved to the locking position to lock the halves of frame 41 and ring 60 together. Pipe clamps 19 and 20 are then actuated to the closed positions, which thus positions fixed ring 60 generally concentric with respect to pipe 18. Index pins 109 are then removed, thereby freeing spool 75 and hence face plate 77 for rotation.

Thereafter, face plate 77 is rotated while stylus 88 is operated to determine the general concentricity of ring gear 76 and hence face plate 77 to pipe 18. In the event that there is substantial deviation from such desired concentricity, it may be necessary to unlatch clamps 19 and 20 and re-perform the clamping operation described above. However, assuming that substantial concentricity of face plate 77 with pipe 18 has been established, face plate 77 is further rotated to determine the location of any external protrusions, as for example, weld seam 90. Having located weld seam 90, face plate 77 is further rotated to place milling machine 92 thereover. Weld seam 90 is then milled by advancing milling machine 92 while rotating cutting tool 95 to the desired extent to provide a smooth external surface to pipe 18. Since weld seam 90 extends axially, cutting tool 95 can be made to track in an axial direction by operation of hydraulic cylinder assemblies 47, 48, and 70, thereby giving a substantial distance of travel between clamps 19 and 20 without removal thereof.

In certain instances, it may be desirable to jack frame 41 along pipe 18 and this can be accomplished by actuating jaws 52 and 53 to engagement with pipe 18 after which clamps 19 and 20 are released and frame 41 caused to move axially relative to clamps 19 and 20 as previously described, at which point clamps 19 and 20 can be re-engaged and jaws 52 and 53 then released. It will thus be apparent that this apparatus provides for means to walk or jack the apparatus along pipe 18 thus performing work operations around the full circumference of pipe 18 over a substantial axial distance, if required. Thereafter, pipe 18 may be cut off by positioning face plate 77 adjacent to the point of cut, actuating cutter assembly 102 and rotating it about pipe 18. During such cutting, the pipe section being cut off can be engaged and supported by jaws 52 and 53 to prevent binding of blade 106.

After pipe 18 is thus cut off to provide a smooth uniform end thereto, spool 75 is rotated to the index position and index pins 109 inserted into spool 75. At this point, pipe clamps 19 and 20, frame 41 and ring 60 are opened and the tool raised. If desired the cut off portion of pipe 18 may be retained engaged by jaws 52 and 53 to carry the same to a convenient dump location.

It will thus be apparent that this tool provides a subsea machine which is readily useful for preparing the ends of bare pipe for receiving an overfitting coupling, whereby the tool can perform a number of functions, including measuring out-of-roundness of the pipe. While so doing, it can record locations of weld seams and any damage that may be evidenced by out-of-roundness of the pipe. It also determines whether or not the pipe is concentric with the face plate 77 as discussed above. Another function of the tool is to mill off the longitudinal weld seam or any other protrusions along a substantial axial length. Another function of the tool is to cut off the pipe leaving a smooth uniform end for receiving an overfitting coupling. It is arranged for hydraulic operation from a remote location, which substantially enhances its usefulness in deep-water locations.

Further modificatons and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In apparatus for performing work on a subsea pipe, the combination comprising:

a support assembly adapted for raising and lowering a body of water;

a remotely operable hydraulic pipe clamp attached to each end of said support assembly for clamping said pipe at two axially-spaced apart positions to support said support assembly such that it is aligned substantially parallel to said pipe;

a carriage supported by said support assembly and axially movable with respect thereto;

a split frame supported by said carriage for axial travel therewith and adapted for opening and closing about the section of said pipe intermediate said clamps;

a split ring gear assembly supported by said frame for rotation therewithin and about said pipe section;

power means for rotating said ring gear assembly relative to said frame;

power means for moving said carriage axially relative to said support assembly;

and means connected to said ring gear assembly for performing work on said pipe section.

2. The invention as claimed in claim 1 wherein said work performing means includes:

means for sensing concentricity of said pipe section and providing a read-out thereof;

and a milling machine for milling a protruding weld seam or the like on the external surface of said pipe.

3. The invention as claimed in claim 1, including:

pipe clamping means supported by said frame for releasably clamping said pipe section at a point intermediate said pipe clamps, whereby said frame may be clamped to said pipe while said pipe clamps are released, and said frame moved axially to thereby permit jacking of said apparatus along said pipe to thereby axially reposition work performing means and permit re-orientation of said clamps on said pipe.

4. In apparatus for performing work on a subsea pipe, the combination comprising:

a remotely operable hydraulic pipe clamp adapted for clamping about said subsea pipe;

a split frame mounted on an axially movable carriage which is operably connected to said clamp, said frame being adapted for opening and closing about a section of said pipe axially adjacent said clamp;

power means operably connected between said clamp and said carriage for moving said carriage and said frame axially relative to said clamp, said power means also being operably connected between said frame and said carriage for moving said frame axially relative thereto;

a split ring gear supported by said frame for opening and closing about and for rotation about said pipe section;

power means for rotating said ring gear relative to said frame;

and means connected to said ring gear for performing work on said pipe section, wherein said work performing means includes means for contacting said pipe and measuring the roundness thereof, means for milling off a portion of said pipe to provide smoother external surface thereto, and means for making a circumferential cut in said pipe to thereby sever said pipe.

5. The invention as claimed in claim 4 including:

a support assembly having said pipe clamp fixedly attached to one end and said split frame axially movably mounted thereon adjacent said pipe clamp;

another pipe clamp fixedly attached to the other end of said support assembly;

and means operably connected between said frame and said support assembly for moving said frame axially relative to said clamps.

6. The invention as claimed by claim 5 wherein:

said split frame has supported thereon pipe clamping means for releasably clamping said pipe section at a point intermediate said two clamps, whereby said frame may be clamped to said pipe while said pipe clamps are released, and said frame moved axially to thereby permit jacking of said apparatus along said pipe to thereby axially re-position said work means and permit re-orientation of said clamps on said pipe.

* * * * *